(12) United States Patent
Prestenback et al.

(10) Patent No.: US 8,949,376 B2
(45) Date of Patent: Feb. 3, 2015

(54) SYSTEM AND METHOD FOR TRANSFERING DATA TO AND FROM A STANDALONE VIDEO PLAYBACK DEVICE

(75) Inventors: Kyle J. Prestenback, Burbank, CA (US); Evan H. Tahler, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 526 days.

(21) Appl. No.: 12/352,772

(22) Filed: Jan. 13, 2009

(65) Prior Publication Data
US 2010/0180010 A1    Jul. 15, 2010

(51) Int. Cl.
| | |
|---|---|
| G06F 15/16 | (2006.01) |
| H04N 7/173 | (2011.01) |
| H04N 21/258 | (2011.01) |
| H04N 21/426 | (2011.01) |
| H04N 21/472 | (2011.01) |
| H04N 21/4788 | (2011.01) |
| H04N 21/658 | (2011.01) |

(52) U.S. Cl.
CPC ..... *H04N 7/17318* (2013.01); *H04N 21/25891* (2013.01); *H04N 21/42646* (2013.01); *H04N 21/47205* (2013.01); *H04N 21/4788* (2013.01); *H04N 21/6581* (2013.01); *H04N 21/6582* (2013.01)
USPC ........... 709/219; 709/220; 709/221; 709/222; 709/223

(58) Field of Classification Search
CPC ....................................................... H04N 21/00
USPC .................. 709/217, 218, 219; 382/209, 210
See application file for complete search history.

(56) References Cited

U.S. PATENT DOCUMENTS

| | | | |
|---|---|---|---|
| 7,519,270 B2 * | 4/2009 | Kim ............................. | 386/353 |
| 8,107,327 B2 * | 1/2012 | Yamashita et al. ......... | 369/30.38 |
| 2002/0116476 A1 * | 8/2002 | Eyal et al. ...................... | 709/219 |
| 2004/0032424 A1 * | 2/2004 | Florschuetz ................. | 345/748 |
| 2005/0198677 A1 * | 9/2005 | Lewis ............................. | 725/87 |
| 2008/0033986 A1 * | 2/2008 | McCusker et al. ........... | 707/102 |
| 2008/0313541 A1 * | 12/2008 | Shafton et al. ................ | 715/725 |
| 2009/0150553 A1 * | 6/2009 | Collart et al. ................ | 709/229 |
| 2009/0228569 A1 * | 9/2009 | Kalmanje et al. ............ | 709/217 |
| 2010/0158391 A1 * | 6/2010 | Cunningham et al. ........ | 382/209 |

OTHER PUBLICATIONS

"GridCast: Improving Peer Sharing for P2p VOD"—Cheng et al, MPI-SWS, Aug. 2008 http://www.mpi-sws.org/~bcheng/doc/gridcast-tomccap.pdf.*

* cited by examiner

*Primary Examiner* — Randy Scott
(74) *Attorney, Agent, or Firm* — Sheppard Mullin Richter & Hampton LLP

(57) ABSTRACT

A server system transfers data via a network to and from one or more "smart" media players. The server system can be used, for example, to facilitate saving and retrieving media player settings, such as user preferences. The server system can also be used, for example, to facilitate a user sharing his or her favorite scene from a movie with other users.

19 Claims, 6 Drawing Sheets

SYSTEM AND METHOD FOR TRANSFERING DATA TO AND FROM A STANDALONE VIDEO PLAYBACK DEVICE

BACKGROUND

The playback of movies, music and other content recorded on optical disks or other packaged media has become commonplace. For example, it is common to insert a prerecorded optical disc into a computer disc drive and use a virtual, i.e., software-based, player to view the content on the computer screen. Integrated video disc players, i.e., machines that have integral screens, can be used similarly. However, the use of computers and computer-like devices to play back content is rooted in the use of standalone players, i.e., player machines that output signals to television screens. Indeed, standalone media players remain quite popular, and it is common for persons to rent or purchase discs to view movies, television shows, and other content through television screens and other home entertainment systems via a standalone player. Newer high-definition (HD) video formats and economical large-screen HD televisions have helped maintain the popularity of this mode of playback.

Videocassette recorders (VCRs) were for many years the dominant type of playback device for consumer use. A VCR is a machine to which a person can connect a television and play back (and record) a videocassette, in which the signals are recorded on magnetic tape. Movies, television shows, and other titles were widely available for rental or purchase on the videocassette medium.

Optical disc media have largely supplanted the videocassette. A common optical disc format is known as DVD. The recording medium (disc) itself is known simply as a DVD. A DVD player plays back a DVD in a manner analogous to that in which a VCR plays back a videocassette. However, the DVD format provides a number of improvements, including on-screen menus that a user can navigate using a remote control. When a person inserts a DVD into a DVD player, the player responds not only to recorded video signals but to recorded data files that include predefined commands for generating on-screen displays, such as menus, sub-menus, and sub-screens. Upon inserting a DVD, the user is typically presented with a main menu listing one or more options, from which the user can select an option using the remote control. The menu options typically include playing back the movie or other main content item in its entirety, navigating to a selected scene or other sub-portion for playback, and navigating to movie trailers, commentary, or other such "bonus material."

A newer generation of optical disc technology provides improved HD video formats and media storage capacity and encompasses so-called "smart" media players. One such technology is known as Blu-ray Disc®. Blu-ray Disc is a registered trademark of the Blu-ray Disc Association, a consortium of consumer electronics, computer, and media manufacturers. Media players that take advantage of advanced features of this newer generation of optical disc technology are referred to as smart media players because they can perform operations that are significantly more complex and computer-like than the simple menu navigation and other operations provided under the DVD standard. This next generation of standards contemplates that media players may include non-volatile data storage, such as solid-state (e.g., flash) memory and magnetic disk drives, as well as programmable processor systems that can execute versatile programming code (such as Java code) read from the disc. In addition, some media players include interfaces for connection to the internet.

SUMMARY

Embodiments of the present invention relate to a server system that transfers data via a network to and from at least one "smart" media player, such as a Blu-ray Disc® player. As a "smart" media player, it can not only play content recorded on the discs or other packaged media but also execute programming code recorded on the packaged media. Under control of such code, a media player can store information in and retrieve information from the server system, and use that information to affect the media player's operation.

In an exemplary embodiment, in conjunction with using a media player to play recorded content, a user can access the server system through a web site by using a conventional computer or other computing device. In this manner, a user can perform operations, such as, for example, setting up an account, logging in to an account, registering discs in the user's possession, storing information that can include various media player settings and instructions, performing operations on such stored information, etc. In addition, a user can access the server system simply by using a media player. For example, a media player can respond to programming code recorded on a disc by causing information to be saved on the server system or retrieved from the server system. The media player can interact with the user via a user interface, such as one involving selectable on-screen menu options, to allow the user to, for example, identify a favorite scene or other portion of the content item, and save a scene identifier on the server system. A second media player, operated by a second user, can respond to programming code recorded on a disc by retrieving the scene identifier stored on the server system, and playing the identified scene for the second user. In some embodiments, the second user can first set up this service by accessing the server system or another system (e.g., a blog web site on which the first user has posted a link to the scene identifier stored on the server system).

Other systems, methods, features, and advantages of the invention will be or become apparent to one of skill in the art to which the invention relates upon examination of the following figures and detailed description. All such additional systems, methods, features, and advantages are encompassed by this description and the accompanying claims.

BRIEF DESCRIPTION OF THE FIGURES

The invention can be better understood with reference to the following figures. The elements shown in the figures are not necessarily to scale, emphasis instead being placed upon clearly illustrating the principles of the invention. Also, in the figures like reference numerals designate corresponding elements throughout the different views.

DETAILED DESCRIPTION

Figure 1:
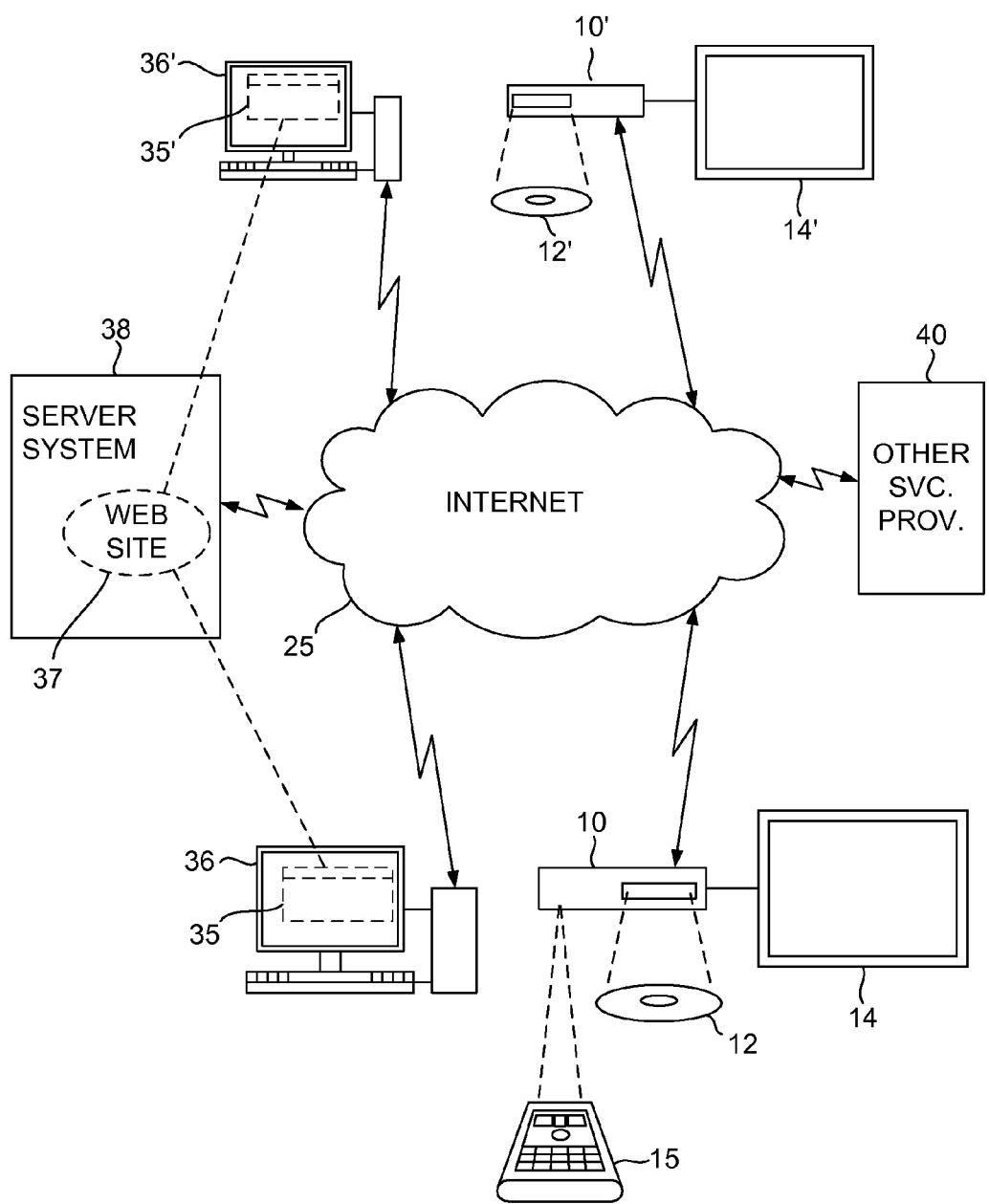
FIG. 1 illustrates a system in which a server system transfers data to and from a number of media players via a data network, in accordance with an exemplary embodiment of the invention.
Figure 2:
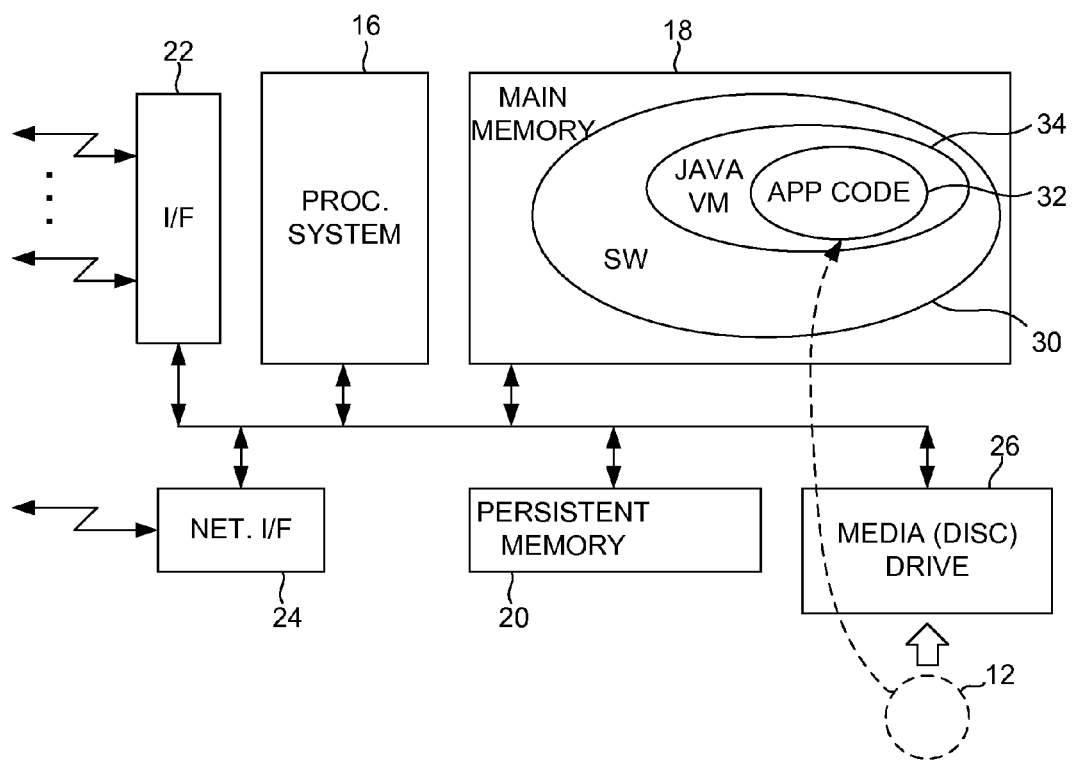
FIG. 2 is a block diagram of a media player in the exemplary embodiment.

As illustrated in FIGS. 1-2 (not to scale), in an illustrative or exemplary embodiment of the invention, each of one or more so-called "smart" media players 10, such as a Blu-ray Disc® disc player, can play content stored on an optical disc 12, on a television display (also referred to as a screen) 14 or similar device to which media player 10 can be connected. Media player 10 can be of a conventional type. A user can interact with media player 10 using a handheld remote control 15 or by pressing buttons (not shown for purposes of clarity) on a control panel of media player 10. Examples of user input that can be provided via remote control 15 or control panel buttons include commands to play a content item that is on disc 12, fast-forward or fast-reverse to a desired point in the content item, navigate through on-screen menus and select menu options, eject disc 12 from media player 10, etc.

Although not described in detail in this patent specification ("herein"), it should be understood that a user can use media player 10 in a conventional manner to play any suitable content item. The networked devices, methods of operation, and packaged media products described herein that relate to the present invention can supplement rather than replace those that are conventional. Thus, for example, in the conventional manner a user can insert a conventionally recorded disc (not shown) into media player 10, use remote control 15 to select a "Play" option from on-screen menu (not shown), and otherwise control media player 10 to view the recorded content item on television display 14.

Although in the exemplary embodiment media player 10 plays optical discs 12, such as Blu-ray Disc-compatible discs, in other embodiments the media player can play any other suitable type of packaged medium. The term "packaged medium" is used herein to refer to a disc or other digital recording medium that a person can obtain such as through conventional retail channels and on which content has been pre-recorded by or at the direction of a party responsible for the production of the packaged medium or its content. Although the term "packaged" medium as used in the art is intended to evoke the commercial manner in which such media are typically provided to consumers who purchase or rent them (i.e., in a box, case or similar commercial packaging), the term "packaged medium" is used herein to mean the recording medium only and does not encompass any packaging materials. The medium can be optical, magnetic, magneto-optical, solid state, or any other suitable type, and can have any suitable physical form, such as a disc, memory module, etc. In the exemplary embodiment, for example, the medium can be a Blu-ray Disc-compatible medium. The related term "packaged media product" is used herein to refer to a set of one or more packaged media on which the content item as well as program code for instructing media player 10 are recorded. As used herein, the term "content item" refers to a movie, serial, newscast, sportscast or other work characterized by its entertaining or informational nature. Content items specifically include (but are not limited to) movies, serials, newscasts, sportscasts, and other works of the types that have long been made available to consumers on various conventional packaged media, such as videocassette, DVD, and more recently, Blu-ray Disc-compatible disc. It should be noted that the manner in which such content items can be recorded on a packaged medium is well understood in the art and therefore not described herein.

As media player 10 is a smart device in the exemplary embodiment, it characteristically includes at least the following computer-like elements that are interconnected via one or more data buses or other suitable means, as shown in FIG. 2: a processor system 16, main or working memory 18, persistent memory or data storage 20, interfaces 22 for connecting television display 14 and other input and output devices, a network interface 24 for connecting media player 10 to the internet 25 (FIG. 1) or other data network, and a media drive 26. In the exemplary embodiment, media drive 26 is a disc drive that can read Blu-ray Disc-compatible discs that a user inserts into it. However, in other embodiments it can be any type of removable-media device that can read any type of removable (portable) data storage medium compatible with that device. It should be understood that the media player architecture or structure shown in FIG. 2 is intended merely to be representative of a typical smart media player and that such media players can have other suitable architectures and other suitable elements. For example, the buses and interfaces that interconnect certain elements can be structured to facilitate transfer of digital video signals. Furthermore, although an all-digital structure is shown for purposes of illustration, it should be understood that such media players can also include analog inputs and outputs.

In operation, software elements are loaded into memory 18 under control of processor system 16 so that processor system 16 can operate upon such software elements. As indicated in broken line in FIG. 2 and described in further detail below, when a user loads disc 12 into media drive 26, software elements 30 that are stored on disc 12, such as application code 32, are loaded into memory 18. In the exemplary embodiment, application code 32 is in the Java language, and thus can be executed by a Java Virtual Machine (Java VM) 34, which is another software element. Although in the exemplary embodiment the language of application code 32 is Java, it should be understood that in other embodiments application code 32 can be provided in any other suitable language or format and executed or otherwise acted upon in any other suitable manner.

Referring again to FIG. 1, in the exemplary embodiment, each of a number of computers 36 is substantially co-located with one or more of the media players 10, such that a person (user) can conveniently use a computer 36 in conjunction with a media player 10 without having to move a great distance. For example, both media player 10 and computer 36 can be located within a residence or other premises occupied by the user. Computer 36 can be, for example, a home computer (e.g., laptop, desktop, etc.). Computer 36 and media player 10 are each connected to internet 25. Although not shown for purposes of clarity, computer 36 and media player 10 and other devices can be networked together in a residential network. Also, although home computers typically are not connected directly to internet 25 but rather are connected via an intermediary internet service provider, such connection details are not shown for purposes of clarity. Although in the exemplary embodiment a user uses computer 36 to access internet 25 as described below, in other embodiments a user can use any other suitable type of computing device, including mobile devices such as a handheld wireless personal digital assistant (PDA) or a multi-function wireless telephone device, to access internet 25. It should be noted that although two computers 36 (one of which is denoted computer 36') and two correspondingly located media players 10 (one of which is denoted media player 10') are shown in FIG. 1 for purposes of illustration, there can be any number of computers 36 and media players 10 to meet the needs of a particular application.

Each computer 36 has general access to internet 25, and thus can be used in the conventional manner, under control of suitable software such as a web browser (represented in FIG. 1 by a browser user interface window 35) to access web sites or other computers and/or services available on the internet. Each computer 36 includes user interface elements that characterize a typical desktop or laptop computer, including a suitable keyboard, mouse or other pointing device, display, etc.

Although each computer 36 has general access to internet 25, embodiments of the invention relate in part to accessing a web site 37 hosted by a server system 38. Also, each media player 10 can access server system 38 through a suitable interface that allows data to be transferred from media player 10 to server system 38 and from server system 38 to media player 10. Server system 38 can comprise any suitable computing elements, such as processors, data storage, etc., that allow it to provide an interactive web site 37 and to store and retrieve information. Server system 38 accordingly includes suitable software elements (not shown), under control of which server system 38 can operate in accordance with the methods described below.

It should be noted that computers 36 and server system 38 can also access other servers or systems on internet 25, such as another service provider system 40. As described below in further detail, other service provider system 40 can comprise a server system that, for example, hosts a blogging web site, provides e-mail service, or provides other such internet-based communication services.

Figure 3:
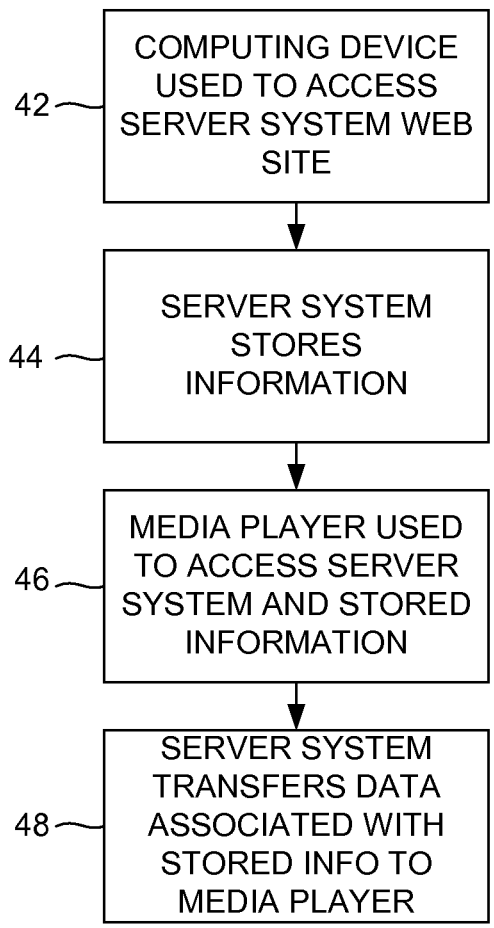
FIG. 3 is a flow diagram, illustrating an exemplary method for transferring data between a server system and one or more media players via a data network.

As illustrated in FIG. 3, data can be communicated among the above-described computers 36, server system 38, and media player 10, in accordance with an exemplary method of the present invention. As indicated by block 42, a user can use one of computers 36 in conjunction with a suitable web browser to access the above-described web site 37 hosted by server system 38. The user of computer 36 can interact with the web site features in the conventional manner, for example, typing information into web page text boxes, selecting options by clicking on graphical buttons with a mouse, etc., to cause various operations to be performed.

An example of an operation that can be included within the scope of the operations indicated by block 42 is setting up an account on web site 37. A user can set up an account in any manner known in the art, such as by selecting a user name and password (or the web site can provide them). Thereafter, each time a user visits web site 37, server system 38 can be provided with the user name and password or otherwise verify the user's identify, to allow the user to access the account.

As another example of an operation that can be included within the scope of the operations indicated by block 42, a user can register one or more discs 12 in the user's possession. For example, a user can enter a Disc Identification (Disc ID) number that is provided on disc 12 or its packaging. Once a user has identified a specific disc 12 (and thus has implicitly identified the content item(s) recorded on that disc 12), the user can provide information that relates to the movie or other content item, such as information that identifies the user's favorite scene in the movie, or other user-selected portion of the content item. Similarly, a user can provide information in the form of comments or annotations that the user can associate with a selected scene or other portion of the content item. The keyboard or similar textual input device that is characteristic of computers 36 and many other computing devices facilitates adding such information.

Another example of an operation that can be included within the scope of the operations indicated by block 42 is setting user preferences with regard to the operation of the user's media player 10. After logging in to an account or otherwise identifying himself to server system 38, the user can select settings for media player 10. The settings can include any that are conventionally included in such media players, such as the language in which text is to be displayed on television display 14, whether subtitles are to be displayed, whether a secondary audio track is to be played instead of the primary audio track, parental security controls, other security settings, etc. Such settings are of the types that users of media players would conventionally set using a remote control to select on-screen menu options or using buttons on a control panel of the media player.

Another example of a media player setting is an instruction for media player 10 to perform some suitable operation. A user could, for example, set an instruction for media player 10 to begin playing back disc 12 at a selected time of day or perform some other operation at a selected time of day automatically, i.e., without requiring further user input.

As part of the response of server system 38 to the above-described operation or operations performed through accessing web site 37, server system 38 stores related information, as indicated by block 44. The information can be of any suitable type that relates to the operation that was performed. For example, the information can include a user name and password, a Disc ID, media player settings such as operational instructions or user preferences, identifications of content item portions (e.g., the user's favorite scenes), user comments and annotations associated with content item portions, etc.

Server system 38 can transfer data associated with player settings, operational instructions, or other the stored information to media player 10 via internet 25. Server system 38 provides a suitable data transfer interface for this purpose, in addition to the web interface described above. A user can indirectly initiate this access of server system 38 simply by using media player 10 in association with the user's account, as indicated by block 46. When a user loads disc 12 into media player 10, media player 10, under the control of so-called "first play logic" searches for the first executable code that is stored on disc 12. ("First play logic is a Blu-ray Disc term, and software elements 30 include logic that is within the scope of meaning of that term.) Thus, when media player 10 finds application code 32, it loads application code 32 into memory 18 and begins to operate under the control of application code 32. Application code 32 is shown for purposes of illustration as stored in or residing in memory 18, it may be retrieved in portions (e.g., modules, sections, routines, libraries, individual instructions, etc.) from disc 12 by processor system 16 on an as-needed basis and thus may not actually reside in memory 18 in its entirety at any point in time. Also, although in the exemplary embodiment media player 10 operates under control of application code 32 that is read from disc 12 on which it is recorded, media player 10 can operate in part under control of other application code (not shown) that is retrieved from any other suitable source, such as from firmware or persistent memory 20 in media player 10 or from a remote server. Media player 10 can access server system 38 under control of application code 32 to obtain information from server system 38, as indicated by block 48 in FIG. 3. Media player 10 can then operate in accordance with the information, including operating in accordance with any user preferences or operational settings that the user may have selected. Operational settings can determine, for example, how and when media player 10 plays back a content item or a selected portion thereof that is recorded on disc 12.

Figure 4:
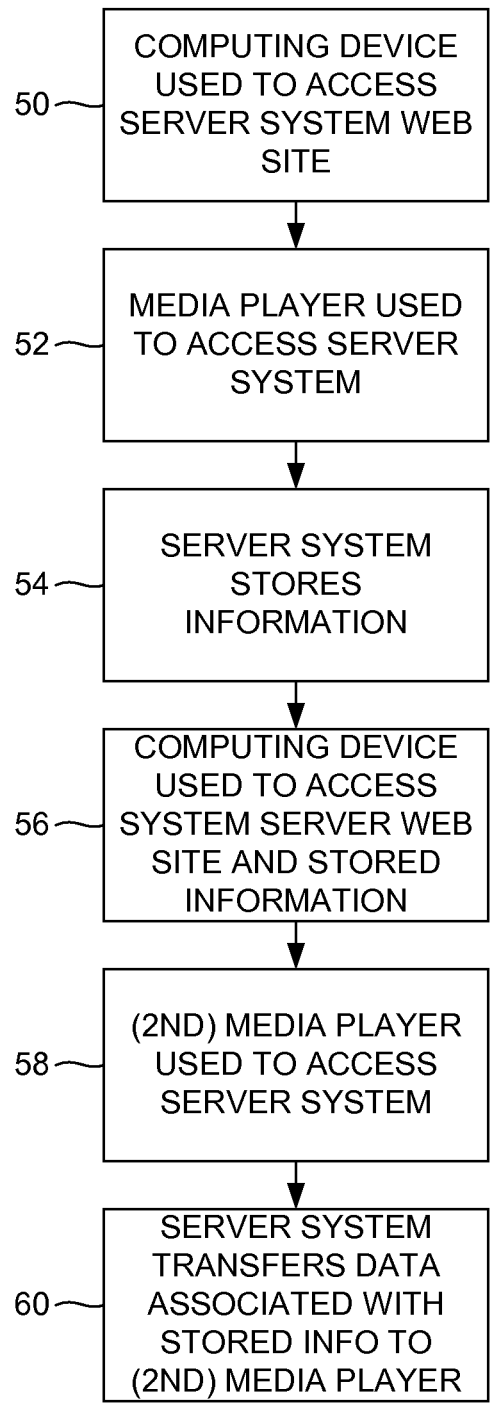
FIG. 4 is a flow diagram, illustrating another exemplary method for transferring data between a server system and one or more media players via a data network.

As illustrated in FIG. 4, data can be communicated among computers 36, server system 38, and media player 10, in accordance with another exemplary method of the present invention. As indicated by block 50, a user can use one of computers 36 in conjunction with a suitable web browser to access the above-described web site 37 hosted by server system 38, in the same manner as described above with regard to step 42 (FIG. 3). The user can set up or log in to an account, and store Disc IDs, media player settings, identifications of content item portions (e.g., the user's favorite scenes), user comments and annotations associated with content item portions, etc.

Alternatively or in addition to accessing server system 38 via the web site interface, the user can indirectly initiate access of server system 38 by using media player 10 in association with the user's account. When the user loads a disc 12 into media player 10, media player 10 can perform operations under control of application code 30 that include, for example, providing menu options through which the user can select a favorite scene or otherwise provide information relating to selected content portions. The operations further include accessing server system 38, as indicated by block 52. In response to being accessed in this manner, server system 38 stores information relating to those operations, such as an indication of the user's favorite scene, as indicated by block 54.

As indicated by block 56, a user can again use one of computers 36 in conjunction with a suitable web browser to access the above-described web site 37 hosted by server system 38 and thus to access the information stored therein. It should be understood that the user need not be the same user who accessed web site 37 as described above with regard to block 50. For example, a first user can access web site 37 in a manner that causes information to be stored, and a second user can access web site 37 in a manner that causes that information to be retrieved and used. A second user can, for example, access web site 37 to examine information that the first user may have provided for public viewing or viewing by a selected set of uses, such as information identifying the first user's favorite scene in a movie or other content item. The second user can set the second user's own account settings to utilize such information relating to a content item in the following manner.

Server system 38 provides access to the information stored in the server system so that a computer 36 or media player 10 can utilize it. For example, a second user can set up the second user's account to transfer information identifying a first user's favorite scene (as played back on the first user's media player 10) to the second user's media player 10' (FIG. 1). After the second user's account is set up in this manner, the second user's media player 10' can operate in accordance with the settings. More specifically, when the second user loads a disc 12' into media player 10', media player 10' can access server system 38 under control of application code 32, as indicated by step 58. In response to being accessed, server system 38 transfers data associated with the information that identifies the first user's favorite scene to the second user's media player 10', as indicated by block 60 in FIG. 4. Media player 10' can then operate in accordance with the information, including playing back the user's favorite scene for the second user.

Figure 5:
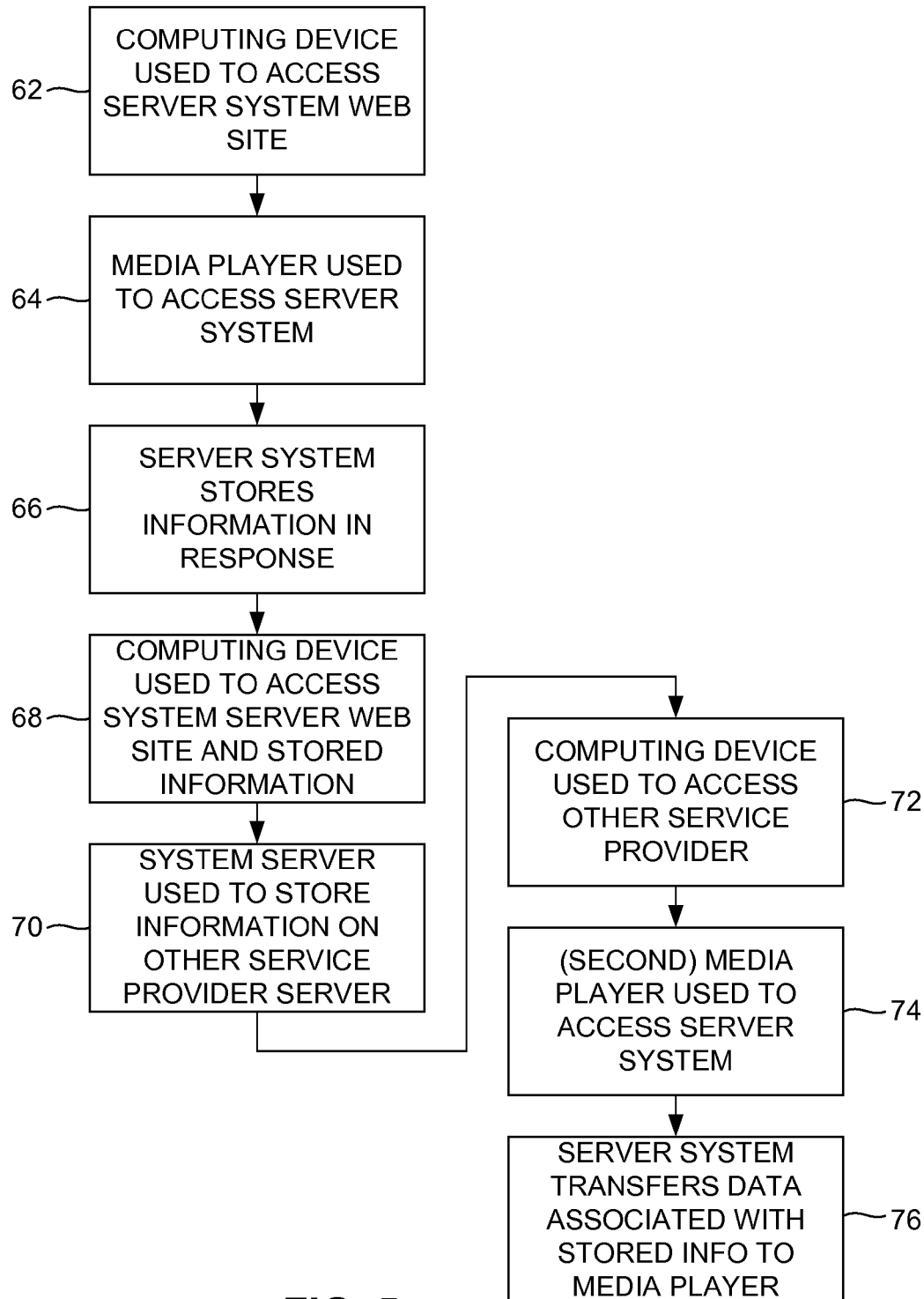
FIG. 5 is a flow diagram, illustrating still another exemplary method for transferring data between a server system and one or more media players via a data network.

As illustrated in FIG. 5, data can be communicated among computers 36, server system 38, and media player 10 in a manner similar to that described above with regard to FIG. 4, but in which another service provider 40 (FIG. 1) serves as an intermediary through which the information is transferred. Blocks 62, 64, 66 and 68 are the same as above-described blocks 50, 52, 54 and 56, respectively. Accordingly, a first user can perform operations that result in related information being stored on server system 38 in a manner that allows the information or other data associated with the information to be accessed by others. The access that server system 38 provides to the information can be, as described above, via a web site interface that allows access by a computer 36 or via a data transfer interface that allows access by a media player 10.

The data that server system 38 can make available for access via web site 37 can include references to network accessible resources and services in the form of, for example, Hypertext Markup Language (HTML) links. Server system 38 can generate a link in response to, for example, information identifying a first user's favorite scene. The (first) user can copy and paste such a link from web site 37 into a blog, e-mail, or other item that may be processed by another service provider 40 (FIG. 1), as indicated by block 70. Then, by clicking on the link in the first user's blog, for example, a second user's web browser will be redirected to web site 37 hosted by server system 38, as indicated by block 72. The second user can then set his or her account on web site 37 to recognize the identified content that is associated with the link as content that the second user would like his or her media player 10' to play. Accordingly, when the second user loads a disc 12' into media player 10', media player 10' can access server system 38 under control of application code 32, as indicated by step 74. In response to being accessed in this manner, server system 38 transfers data associated with the link to media player 10', as indicated by block 76. Media player 10' can then operate in accordance with the transferred data, including playing back the identified scene or other content portion on disc 12. In this manner, a user can make other users aware of a content portion, such as a favorite scene, that he or she selected.

Figure 6:
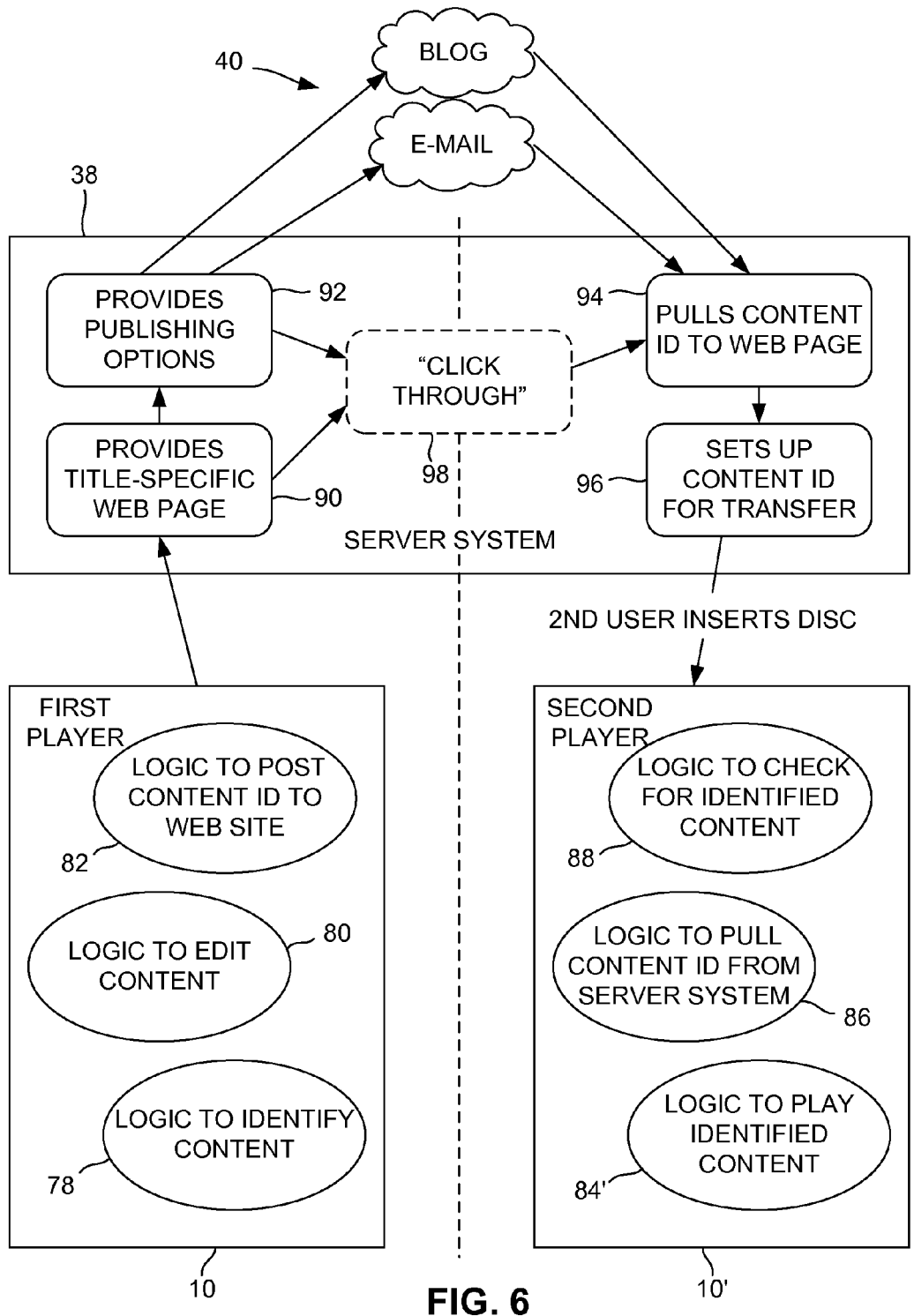
FIG. 6 illustrates in further detail the interaction among two exemplary media players and the server system in the exemplary method of FIG. 5.

The method described above with regard to FIG. 5 is represented in FIG. 6 in a manner that shows the interaction among media players 10 and 10' and server system 38 in further detail. The operation of a media player 10 is controlled by logic that is defined by the operation of hardware elements such as processor system 16 upon software elements such as application code 32. Each disc 12 can have application code 32 recorded on it that, when operated upon by processor system 16, implements at least the following logic: logic 78 that controls how the user interacts with player 10 to identify content; logic 80 that controls editing features available to the user; logic 82 that controls transferring (or "posting" as it is sometimes referred to in the art) data associated with the identified content to server system 38; logic 88 that controls how player 10 checks or polls server system 38 to determine if such data has been posted; logic 86 that controls transferring (or "pulling" as it is sometimes referred to in the art) data from server system 38 to player 10; and logic 84 that controls how player 10 plays the identified content portions on disc 12.

When a first user loads disc 12 into (first) player 10, player 10, operating at least in part under control of application code 32, presents the user with an on-screen menu (not shown). In addition to conventional menu options, such as an option to play the content (e.g., a movie), logic 78 causes an additional on-screen menu option (not shown) to be presented that advises the user of a feature that allows others to be made aware of the user's selection of a scene in the movie (e.g., the user's favorite scene). If the user selects this option, logic 78 guides the user through an interactive process by which the user can view portions of the movie or other content and select a scene or other portion. Logic 78 can identify the scene by the timecode values at which the selected portion starts and ends. Logic 80 guides the user through additional interactive processes by which the user can edit the content portions. For example, a user can make notations or add comments. Any such additional information is associated with the identified content portion. Logic 82 causes player 10 to transfer or post the information, such as the timecode values and any additional information, to server system 38.

Server system 38 operates under the control of suitable software (not shown for purposes of clarity) to provide a number of web-based functions, including: a function 90 for providing a web page that is specific to the content item (e.g., a movie or "title" as a specific movie or similar work is referred to in the art); a function 92 for providing a web page that presents the user with options for transferring (or "publishing" as it is sometimes referred to in the art) the information to a blog, e-mail, or other destination where it is accessible to others; a function 94 for transferring or pulling the information from server system 38 to (second) media player 10'; and a function 96 for setting up the information for transfer.

When the first user logs in to server system 38, server system 38 interacts with the user through a web page (function 90) for each movie in which the user has identified a favorite scene. Server system 38 stores the timecode values and any additional information associated with the scene or scenes that the user identified.

Server system 38 can then interact with the user through that web page or further web pages that prompt the user to select a publishing option (function 92). For example, if the user selects a publishing option directed to a blog, server system 38 generates an HTML link that the user can then cut and paste into his or her blog page (e.g., provided by service provider 40).

When a second user views the blog, the second user can click on the HTML link if the second user wishes to view the scene or other content identified by the first user. In response to clicking on the link, the second user's web browser is redirected to web site 37. Web site 37 presents the second user with a web page (function 96) that relates to the identified content item and sets up the second user's account for the information transfer or "pull" operation described below.

Other publishing options can involve publishing channels (not shown for purposes of clarity) that reach communication systems beyond the internet, such as cellular telephone network short messaging system (SMS) channels. In the event that such publishing options are selected, a second user may need to interact with external interfaces, such as web pages or SMS interfaces provided by external service providers (i.e., other than server system 38). User interaction that takes a user from a first web site through intermediaries to a destination web site is sometimes referred to in the art as a "click through" process and is represented in FIG. 5 by a process 98.

Then, when the second user loads disc 12 into second media player 10', i.e., a disc on which is recorded the same content item as the disc 12 that the first user loaded into first media player 10, logic 88 causes second media player 10' to check or poll server system 38 to determine whether the above-described information relating to an identified content portion is set up to be pulled. If the pull operation has been set up as described above, then logic 86 causes second media player 10' to transfer or pull that information from server system 38. Finally, once second media player 10' has obtained the information, second media player 10' can use the timecode values to locate and play the identified scene or other content portion. If the information includes additional information that the first user has added through editing, second media player 10' accordingly provides that information to the user in a manner appropriate to the type of information.

While one or more embodiments of the invention have been described as illustrative of or examples of the invention, it will be apparent to those of ordinary skill in the art that other embodiments and implementations are possible that are within the scope of the invention. Accordingly, the scope of the invention is not to be limited by such embodiments but rather is determined by the appended claims.

What is claimed is:

1. A method for communicating information between a server system and one or more standalone media players via a data network, comprising:
   responding at a server system to a first user-initiated access of the server system via the data network, the first user-initiated access including web site access by a user-operated computing device, the web site access including receiving from the computing device account information identifying a first server system account, receiving information from the computing device identifying a content item, and receiving user-generated content from the computing device;
   storing the user-generated content in the server system in response to the web site access, the user-generated content related to the content item and for use during playback of the content item; and
   further responding at the server system to a second user-initiated access of the server system via the data network by a standalone media player playing the content item from a portable packaged medium loaded in the media player and having the content item recorded thereon, the second user-initiated access including automatically transferring the user-generated content stored in the server system to the standalone media player via the data network in response to the standalone media player playing the content item from the portable packaged medium.

2. The method claimed in claim 1, wherein the user-generated content comprises an identifier identifying a user-selected portion of the content item.

3. The method claimed in claim 1, wherein the user-generated content comprises an instruction to begin playing the content item at a selected time.

4. The method claimed in claim 1, wherein the user-generated content relates to operation of the media player for playback of the content item.

5. The method claimed in claim 4, wherein the user-generated content relates to user-selected player settings for playback of the content item.

6. The method of claim 1, wherein the second user-initiated access comprises the standalone media player automatically polling the server system to determine whether any user-generated content related to the played content item is set up to be pulled.

7. The method of claim 6, wherein the second user-initiated access comprises the standalone media player automatically polling the server system to determine whether any user-generated content related to the played content item and created by a particular user is set up to be pulled.

8. The method of claim 6, further comprising responding at the server system to a third user-initiated access of the server system via the data network by a second user-operated computing device, the third user-initiated access preceding the second user-initiated access and comprising:
   receiving from the second user-operated computing device account information identifying a second server system account; and
   setting up the user-generated content to automatically be pulled by a media player associated with the second server system account.

9. The method of claim 8, wherein the standalone media player is associated with the second server system account.

10. The method of claim 1, wherein the first user-initiated access further comprises registering a portable packaged medium having the content item recorded thereon with the first server system account.

11. The method of claim 1, wherein the user-generated content comprises at least one of a user's favorite scene from the content item or a user's comments about the content item.

12. The method of claim 5, wherein the user-selected player settings for playback of the content item comprise parental security controls.

13. A method for communicating information relating to a content item with one or more standalone media players, comprising:
   a first standalone media player reading first code recorded on a first removable and portable packaged medium physically loaded in the first standalone media player, the first removable packaged medium further having a content item recorded thereon;
   the first standalone media player performing instructions under control of a processor system in accordance with the first code to save user-generated content on a remote server system via a data network, the user-generated content related to the content item and for use during playback of the content item recorded on the packaged medium loaded in the first media player;
   a second standalone media player reading second code recorded on a second removable and portable packaged medium physically loaded in the second media player, the second packaged medium also having the content item recorded thereon; and
   the second standalone media player performing instructions under control of a processor system in accordance with the second code to pull the user-generated content from the remote server system to the second media player via the data network.

14. The method claimed in claim 13, further comprising a user of the first media player accessing a web site on the remote server using a computing device to further process the user-generated content.

15. The method claimed in claim 13, wherein the user-generated content comprises an identifier identifying a user-selected portion of the content item.

16. The method of claim 13, wherein the second code further instructs the second media player to poll the server system to determine whether the user-generated content is set up to be pulled.

17. A physical, removable and portable packaged media product for playback on a standalone media player, the packaged media product comprising a player-readable medium on which is recorded in machine-readable form a content item and code for, when executed by the standalone media player, instructing the standalone media player to play the content item and:
   perform instructions under control of a processor system to save user-generated content on a remote server system via a data network, the user-generated content related to the content item and for use during playback of the content item recorded on the packaged medium physically loaded in the standalone media player, the user-generated content also including an instruction to begin playing the content item at a selected time; and
   perform instructions under control of a processor system in accordance with a second code to pull second user-generated content from the remote server system to the media player via a data network, wherein the second-user generated content is related to the content item and for use during playback of the content item.

18. The packaged media product of claim 17, wherein the user-generated content comprises an identifier identifying a user-selected portion of the content item.

19. The packaged media product of claim 17, wherein the second code further instructs the media player to poll the server system to determine whether any user-generated content related to the played content item is set up to be pulled.

* * * * *